April 13, 1926.  1,580,609
R. KANIA
AGRICULTURAL IMPLEMENT
Filed Dec. 18, 1924   2 Sheets-Sheet 1
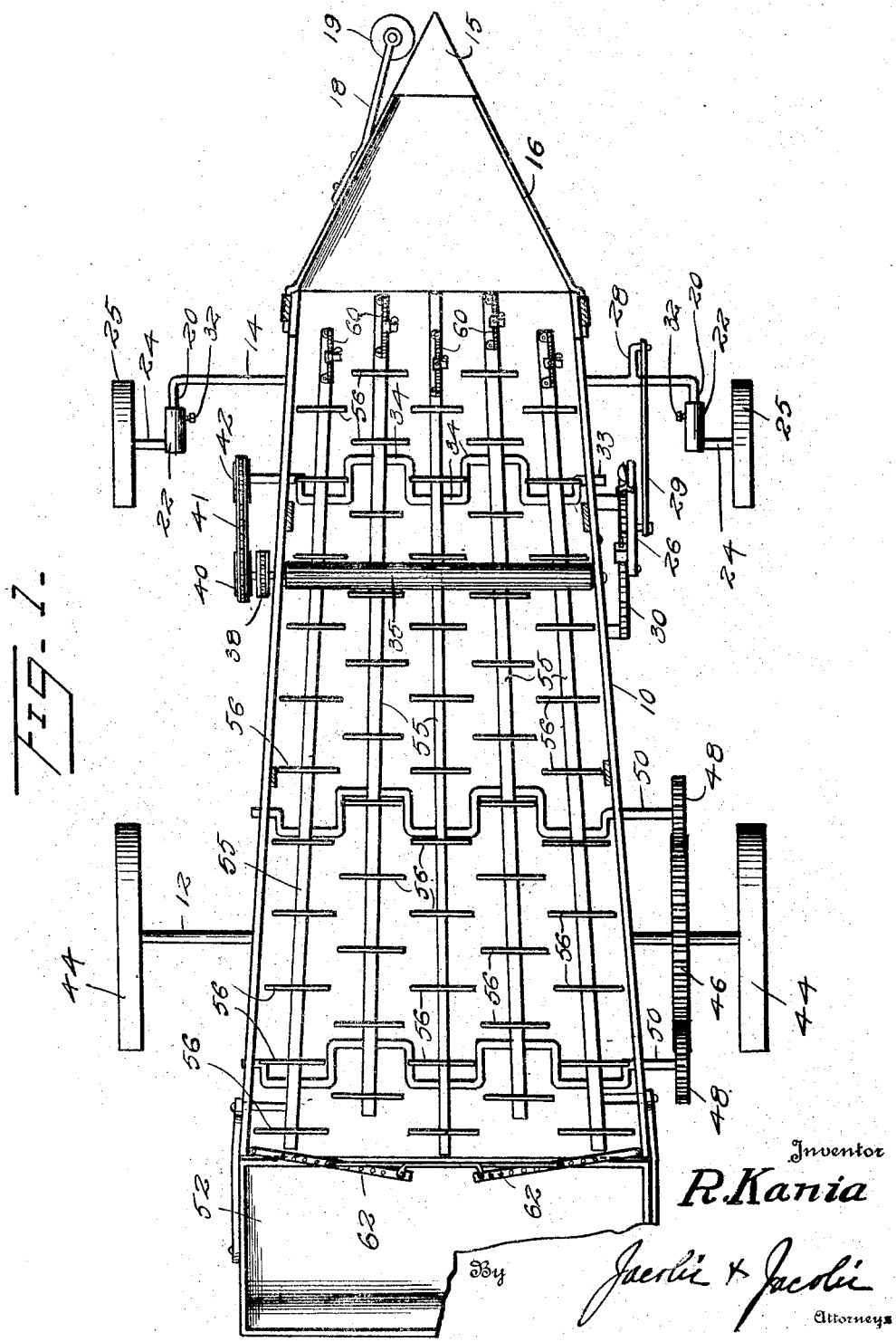

April 13, 1926.
R. KANIA
AGRICULTURAL IMPLEMENT
Filed Dec. 18, 1924   2 Sheets-Sheet 2
1,580,609
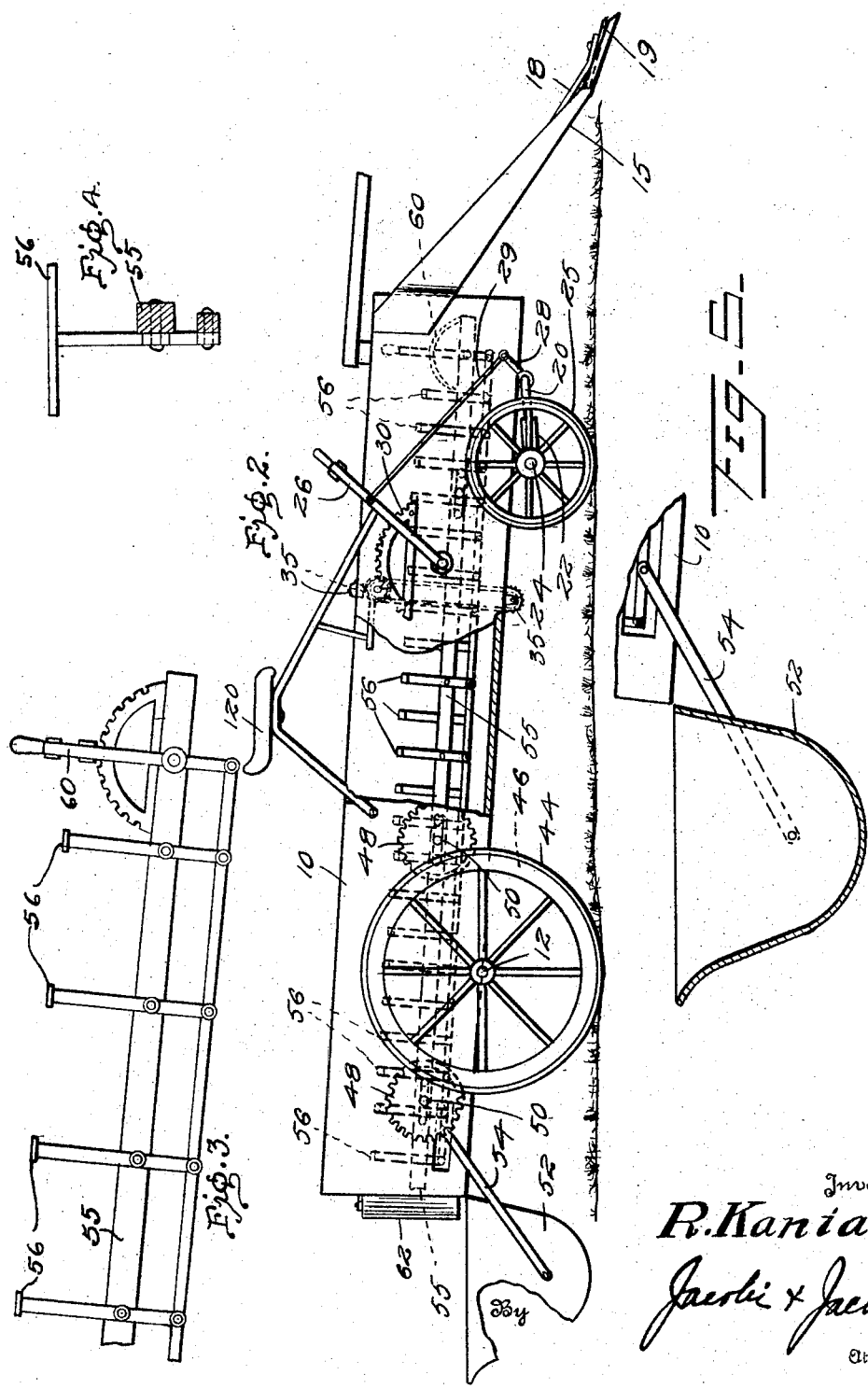
Inventor
R. Kania.
By Jacobi & Jacobi
Attorneys Patented Apr. 13, 1926.

1,580,609

UNITED STATES PATENT OFFICE.

RUDOLPH KANIA, OF VINDEX, MARYLAND.

AGRICULTURAL IMPLEMENT.

Application filed December 18, 1924. Serial No. 756,808.

*To all whom it may concern:*

Be it known that RUDOLPH KANIA, a citizen of the United States, residing at Vindex, in the county of Garrett and State of Maryland, has invented certain new and useful Improvements in Agricultural Implements, of which the following is a specification.

This invention relates to agricultural apparatus and particularly to a machine for digging potatoes.

The features of the invention include, among others, a novel arrangement of the digging shovel, the construction and arrangement of the forward axle which permits the shovel to be adjusted with respect to the ground, crushing rolls and their mounting and drive mechanism; the reciprocating raker or feed bars and screen, and their manner of operation from the main drive wheels of the digger and in the specific machine frame, receiving pocket and row forming elements.

With these and other objects in view, my invention consists in the novel features of construction, combination and arrangement of parts as will be hereinafter referred to and more particularly pointed out in the specification and claims.

In the accompanying drawings:—

Figure 1 is a top plan view of the complete machine;

Figure 2 is a side elevation thereof;

Figure 3 is a side elevation of a conveyor rake.

Figure 4 is a transverse sectional view of the portion of the machine shown in Figure 3.

Figure 5 is a fragmentary sectional view of the rear portion of the machine.

In the accompanying drawings I have shown my apparatus as comprising a truck embodying an elongated frame 10 arranged transversely of which toward the opposite ends are the axles 12 and 14, the former constituting the drive or power axle through which the elements of the machine are operated, said axles with their coacting mechanism to be later described.

At the forward end of the machine is arranged a triangular scoop or shovel 15, said scoop or shovel having supported thereon, a forwardly projecting arm 18 carrying a grass cutting disk wheel or knife 19. The machine is drawn through the medium of a draft tongue to which the team may be attached in the usual manner.

The front axle 14, while non-rotatable is capable of rocking in its bearings and has rigidly secured to each of its ends beyond the sides of the machine frame, a radially etxending arm 20, which has telescopic relation with a sleeve 22 having a horizontal stub axle 24 carrying a ground wheel 25. The axle 14 is rocked to vary the elevation of the forward end of the truck with relation to the ground surface through the medium of a lever 26 pivoted on the side of the frame and connected with a rigid radial arm 28 on the said axle by a link 29, a detent on the lever coacting with a toothed segment 30 to lock the axle in adjusted position. The arm 20 and sleeve 22 are held in longitudinally adjusted position through set screws 32.

Journaled transversely of the frame 10, at the forward end thereof is a transverse crank shaft 33 carrying a plurality of cranks 34 which coact with the rake to be later described.

Journaled in the side members of the machine, toward its forward end are a pair of transverse crushing rollers 35 arranged above the rake, one of said rolls, and as illustrated, the upper one, being corrugated or longitudinally fluted, as indicated in Fig. 1, and upon the shaft extension of which are keyed intermeshing gears 38, one of said shafts having keyed on its extreme end beyond the gear, a sprocket wheel 40, which through a sprocket chain 41 is driven from a sprocket wheel 42 on one end of the crank shaft 33.

The rear drive or traction wheels 44 rotatable with the rear drive axle 12, transmit rotary motion to a large spur gear 46 which meshes with relatively smaller spur gears 48 fixed on the outer ends of a pair of crank shafts 50 journaled in the sides of the frame and transversely thereof.

The means for conveying the material from the scoop or shovel 15 at the forward part of the machine, to be finally delivered into a receiving pocket 52 operable through a handle 54, comprise a parallel series of longitudinal conveying or raking bars 55, having raking blades 56 at their upper sides, said bars being interconnected with the cranks of the several crank shafts in such manner and to the end that alternate bars are moving in one direction while the others are moving in the opposite direction and impart to the material being passed through the machine, a step by step motion. The blades 56, are directly carried by upwardly extending rods pivoted near their lower ends on the said raking bars, said rods being tiltable upon their pivots through a lever and rack segment mechanism 60.

Located at the rear of the machine are a pair of adjustable boards 62 hinged at their ends to the side frame members of the machine, and between the opposed inner ends of which the material passes to make the rows in the rear of the apparatus. The machine is also provided with a driver's seat 120.

From the foregoing description of the construction of my improved apparatus, it will be seen that I have provided a simple, inexpensive and efficient means for carrying out the objects of my invention and while I have particularly described the elements best adapted to perform the functions set forth, it is obvious that various changes in form, proportion and in the minor details of construction may be resorted to without departing from the spirit or sacrificing any of the principles of the invention.

What I claim as my invention is:—

1. An agricultural implement comprising a truck having a front and a rear axle, a scoop mounted at the forward end of said truck, means for varying the elevation of the scoop with relation to the ground, crushing rolls journaled transversely on said truck in the rear of said scoop, a pair of crank shafts journaled transversely of said truck, one upon each side of said rear axle, means operatively connecting the rolls with the crank shaft, alternately reciprocating rake bars arranged parallel within the sides of the frame of said truck and connected with said crank shafts and means driven by said rear axle for rotating the last mentioned crank shafts.

2. An agricultural implement comprising a truck having a front and a rear axle, drive wheels on said rear axle, a scoop mounted at the forward end of said truck, means for adjusting the elevation of the scoop with relation to the ground, crushing rolls journaled transversely of said truck, a pair of crank shafts journaled transversely of said truck, respectively, at the forward and rear portions thereof, means operatively connecting the rolls with the crank shafts, rake bars connected at their ends respectively with the cooperating cranks of said crank shafts, each of said rake bars having a perpendicular series of rake teeth, means for varying the angle of said teeth with respect to said bars and means connecting said drive wheels and said cranks for imparting reciprocation to said rake bars.

In testimony whereof I affix my signature.

RUDOLPH KANIA.